United States Patent Office.

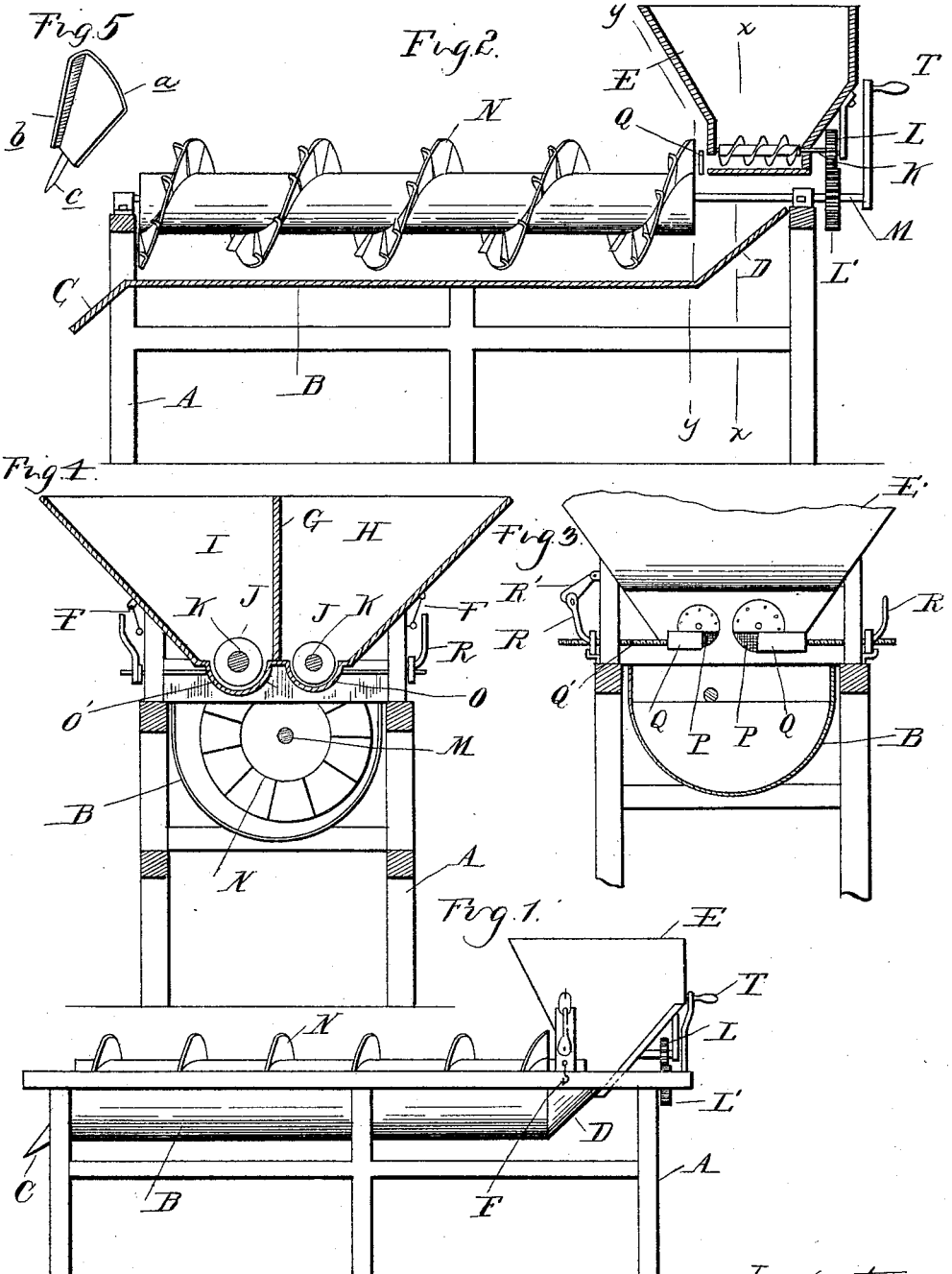

JOHN SKINNER, OF FLINT, MICHIGAN.

MIXING-MACHINE FOR CONCRETE, MORTAR, &c.

SPECIFICATION forming part of Letters Patent No. 475,618, dated May 24, 1892.

Application filed October 16, 1891. Serial No. 408,859. (No model.)

*To all whom it may concern:*

Be it known that I, JOHN SKINNER, a citizen of the United States, residing at Flint, in the county of Genesee and State of Michigan, have invented certain new and useful Improvements in Mixing-Machines for Concrete Mortar, &c., of which the following is a specification, reference being had therein to the accompanying drawings.

This invention relates to new and useful improvements in cement-mixers; and the invention consists in the peculiar construction, arrangement, and combination of the various parts, all as more fully hereinafter described.

In the drawings, Figure 1 is a side elevation of my improved device. Fig. 2 is a vertical central longitudinal section. Fig. 3 is a cross-section on the line $y\ y$, Fig. 2, looking to the right. Fig. 4 is a cross-section through line $x\ x$ in Fig. 2, looking to the left. Fig. 5 is a detached perspective view of one of the sections of the conveyer-blade.

My invention is especially designed for mixing cement for paving or sidewalk purposes when it is required in large quantities.

A is a frame, in which is stationarily secured a mixing-trough B, extending from one end to a point near the opposite end. This trough is provided with a delivery-apron C and an inclined feed-board D at opposite ends, respectively. Secured above this feed-board is a hopper E, this hopper being detachably secured in position by means of hooks F or in any other suitable manner. The hopper is divided centrally by means of the partition G into the parts H and I. Beneath each half of the hopper is arranged a spiral conveyer J, the shafts K thereof being journaled in suitable bearings on the frames extending to the front end, where they are provided with pinions L, engaging with the drive gear-wheel L', secured upon the main drive-shaft M, also journaled in bearings in the frame and extending centrally beneath the hoppers, and secured to the spiral conveyer N, of suitable size, to work in the trough B. Troughs O O' connect the hoppers H and I, respectively, with the trough B, the spiral conveyers J working in said troughs.

P are exits from the troughs O O', each of which is controlled by a valve Q upon a screw-threaded shaft Q', extending to the side of the machine, and they are provided with a suitable adjusting-nut having a handle R for moving said valves to open the feed-apertures P more or less.

By making the hopper detachable I have access to the conveyers J in case of clogging to the best advantage.

R' is a strap for securing the adjusting-levers R after they have been adjusted.

A crank-handle T imparts motion to the conveyer N and through the gearing described to the conveyers J, so that the material is fed from the hoppers into the trough B, and the conveyer N not only carries the material to the opposite end of the trough, but also thoroughly mixes it.

The conveyer-blade I preferably construct of sections, as shown in Fig. 5, consisting of a spiral blade $a$ and a flange $b$, extending at an angle thereto, this flange projecting beyond the blade and forming a lip extending between the conveyer-blades and arranged upon the shaft and assists in stirring and more thoroughly mixing the cement. These sections I secure to the shaft in any desired manner, but preferably by forming a pin or bolt $c$ at the lower end, which is adapted to be driven into the shaft, which I make of wood, thus making them readily detachable in case of breakage. It will also be observed by inspection of Fig. 4 that my conveyer is set to one side with the lower edge of the wings slightly above the bottom of the conveyer, thus forming a gradually-increasing space between the sides of the conveyer, commencing at one side and extending across the bottom to the top of the other side. The object of this is in handling lumpy material to allow of the larger particles or lumps being fed along with the least possible friction.

What I claim as my invention is—

1. The combination, with the trough B, the hoppers H and I, the inclined apron D beneath said hoppers, the troughs O O', the conveyers J therein, the conveyer N, shaft M, the crank-handle T, and the gear-wheels L and L', substantially as described.

2. In a cement-mixer, the combination, with the frame A, the trough B, the conveyer N therein, the shaft M for driving said conveyer, the hoppers H and I, the troughs O O' at the base of said hoppers, the conveyers J in said troughs, the valves Q, the shafts Q', and adjusting-levers R, substantially as and for the purpose described.

3. In a cement-mixing machine, the combination, with the feed mechanism, of a conveyer consisting of the trough, the shaft, the conveyer-wings consisting of the blades $a$, having the flange $b$ and pin $c$, substantially as described.

In testimony whereof I affix my signature in presence of two witnesses.

JOHN SKINNER.

Witnesses:
ADOLPH BARTHEL,
P. M. HULBERT.